Patented May 8, 1923.

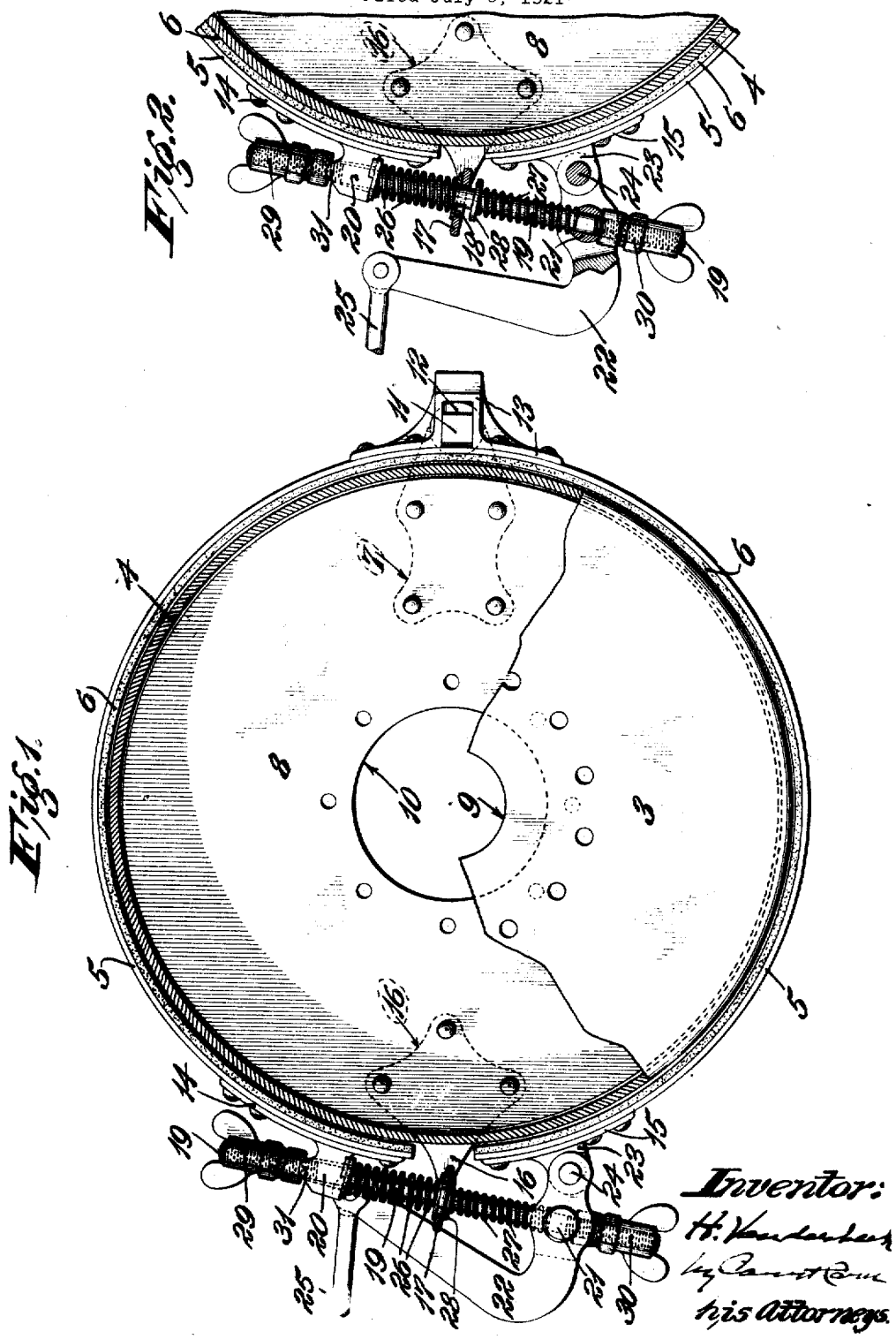

1,454,091

UNITED STATES PATENT OFFICE.

HERBERT VANDERBEEK, OF DETROIT, MICHIGAN, ASSIGNOR TO THE TIMKEN-DETROIT AXLE COMPANY, OF DETROIT, MICHIGAN, A CORPORATION OF OHIO.

BRAKE MECHANISM.

Application filed July 8, 1921. Serial No. 483,175.

*To all whom it may concern:*

Be it known that I, HERBERT VANDERBEEK, a citizen of the United States, and a resident of the city of Detroit, in the county of Wayne and State of Michigan, have invented a new and useful Improvement in Brake Mechanism, of which the following is a specification.

This invention relates principally to brake mechanisms of the external contracting friction band type particularly adapted for use in connection with wheels of motor vehicles.

One of the principal objects of the present invention is to provide a simple and efficient means for adjusting the brake band to take up wear of the brake lining and to secure a uniform clearance between said lining and the brake drum. Another object is to provide separate means for adjusting each half of the brake band, whereby one of said halves may be adjusted without disturbing the adjustment of the other half. Other objects are to provide for simplicity and cheapness of construction and to obtain other advantages.

The invention consists principally in the improved means for adjusting the brake band; and it also consists in the combinations and arrangements of parts hereinafter described.

In the accompanying drawing, which forms part of this specification, and wherein like numerals refer to like parts wherever they occur, Fig. 1 is a vertical cross-section through a brake drum, a brake mechanism embodying my invention being shown in connection therewith, the brake being shown in released position; and Fig. 2 is a fragmentary cross-section similar to Fig. 1 showing the brake in applied position.

The brake mechanism shown in the accompanying drawing comprises a brake drum 3 adapted to be secured to the rear wheel (not shown) of the motor vehicle. The brake drum is provided with a peripheral rim or brake flange 4. which is encircled by an external band brake comprising a split semi-flexible metallic band 5 having a suitable brake lining material 6. The brake lining 6 is riveted or otherwise secured to the inner surface of the metallic band 5 and is adapted to frictionally engage the outer braking surface of the brake flange 4 of the brake drum.

The brake band 5 is held from rotating with the brake drum by means of an anchor bracket 7, which is riveted to the inner face of a stationary brake disk or dust guard 8. This brake disk 8 closes the open end of the brake drum and is adapted to be rigidly secured to the stationary axle housing (not shown). The brake drum and the stationary brake shield 8 are provided, respectively, with axially alined central circular openings 9 and 10, through which project the axle housing and the wheel hub, respectively.

The anchor bracket 7 is secured to the brake shield 8 at a point diametrically opposite to the opening in the brake band and is provided with an anchor stud 11, having a squared end portion which projects into the channeled portion 12 of a center fitting 13. The center fitting 13 is riveted or otherwise rigidly secured to the outer surface of the brake band midway between the ends thereof. The channeled portion 12 of the center fitting 13 of the brake band is closed by said brake band and is of a depth sufficient to permit slight movement of said fitting towards and away from the axis of the brake drum when said band is contracted and expanded.

The brake band is contracted to bring the lining material thereof into frictional engagement with the outer surface of the brake flange by means of an operating mechanism which is operatively connected to the ends of said band. Said mechanism comprises end fittings or bracket members 14 and 15, which are rigidly secured to the respective upper and lower ends of the brake band, and a bracket 16, which is rigidly secured to the stationary brake disk 8 adjacent to said end fittings. The bracket 16 is provided with an abutment flange 17 that projects beyond the periphery of the brake drum and is slotted transversely to the axis of the brake drum, as at 18, to receive a stud 19.

The upper end portion of the stud 19 passes through a conical bore in an outwardly projecting lug portion 20 of the uppermost end fitting 14; and the lower end portion of said stud passes through a transverse bore in a trunnion pin 21. The trunnion pin 21 has its end portions journaled in the spaced branches of the bifurcated outer end portion of the lower arm of a bent operating lever 22. The free end of the lower arm of the operating lever 22 is pivotally secured to a lug 23 on the lowermost end fitting 15 by means of a pivot pin 24, which passes through alined holes in said lug and in the branches of the bifurcated portion of said lever. The usual pull rod 25 is pivotally connected to the free end of the upper arm of the operating lever and is extended forward for connection with a foot pedal or hand operating lever (not shown).

Sleeved on the stud 19, above and below the abutment bracket 16, are helical springs 26 and 27. The uppermost spring 26, which is of a larger diameter than the spring 27 and loosely surrounds the stud, is supported at its lower end on the upper surface of the abutment flange 17 of the bracket 16 with its upper end bearing against the under side of the lug 20 on the uppermost end fitting 14. The lowermost spring 27 is supported at its lower end on the upper surface of the trunnion pin 21. The upper end of the spring 27 cooperates with the under side of a shoulder or collar 28 formed integral with the stud 19 adjacent to the underside of the abutment flange 17.

The upper and lower ends of the stud 19 extend beyond the lug 20 of the uppermost end fitting 14 and the trunnion pin 21, respectively, and are threaded to receive winged nuts 29 and 30, respectively. The upper surface of the lug 20 of the uppermost end fitting 14 is provided with convex portions 31 adapted to cooperate with concave depressions in the adjacent face of the adjusting nut 29, whereby said nut is prevented from becoming loosened.

The lowermost adjusting nut 30 is also formed with concave depressions, which cooperate with the under side of the trunnion pin 21 on opposite sides of the contracting stud 19 and prevent said nut from becoming loosened.

When it is desired to apply the brake, the brake pedal or lever is actuated to pull the pull rod 25 forward, thereby causing the operating lever 22 to fulcrum on the trunnion pin 21. This action causes the bifurcated end of the lower arm of the lever to swing upward and, by reason of the pivotal connection between said arm and the lower end of the brake band, force said end upward into engagement with the brake drum. This upward movement of the lower end of the brake band draws the lower half of said band tightly about the lower half of the brake drum. After the lower end of the brake band has engaged the drum, the fulcrum point of the operating lever is shifted from the trunnion pin 21 to the pivot pin 24, whereby a continued forward pull on said lever pulls down the contracting stud 19 and causes the upper half of the brake band to be drawn tightly around the upper half of the drum. The downward movement of the stud 19 causes the lowermost spring 27, together with the collar portion of said stud to move away from the abutment flange 17, while the downward movement of the uppermost end fitting 14 causes the uppermost spring 26 to be compressed between said bracket and said uppermost end fitting 14.

Upon release of the operating lever, the uppermost spring 26 forces the uppermost end fitting 14 upwardly, thereby releasing the upper half of the brake band from engagement with the brake drum. The pressure of the spring 26 against the uppermost end fitting 14, also causes the stud, together with the trunnion pin 21, to move upwardly with said fitting, which action releases the lower half of the brake band from engagement with the brake drum. This upward movement of the stud 19 and trunnion pin 21 continues until the collar portion 28 of said stud engages the abutment flange 17, thereby preventing further lifting of said stud by the lowermost spring 27. The lowermost spring 27, which remains inactive when the brake is applied, cooperates with the collar portion 28 of the stud 19 and the trunnion pin 21 to hold the pin 21 in engagement with the lowermost adjusting nut 30 and also to prevent movement of said pin with respect to said stud, except when the nut 30 is manipulated to adjust the lower half of the brake band.

With the arrangement described, either half of the brake band may be readily adjusted independently of the other half, to take up wear of the brake lining or to obtain an even amount of clearance between both halves of the brake band and the braking surface of the brake drum, by manipulating the winged nuts 29 and 30.

Obviously my invention is applicable to rotating elements of various kinds, and it is evident that the device is adapted for use in connection with friction brakes comprising hinged half sections and that numerous changes may be made without departing from my invention.

What I claim is:—

1. A rotatable element having a braking surface, a split brake band adapted to frictionally engage said surface, an anchor for said band, means operatively connected to the ends of said band for expanding and contracting the same, a fixed member adjacent to said ends, and means associated with said fixed member and the end portions of said band for adjusting the clearance between one half of said band and said rotating element without disturbing the adjustment of the other half of said band.

2. A rotary member, a circumferentially contractible split brake band encircling said member and adapted to frictionally engage the outer surface thereof, means for preventing rotation of said band, operating means operatively connected to the ends of said band for contracting and expanding the same into and out of engagement with said rotary member, and adjustable means operatively connected to said operating means for regulating the clearance between one half of said band and said rotary member independently of the other half of said band, said last mentioned means comprising a fixed portion with reference to which the adjustments are made for both halves.

3. A brake drum, an open external friction brake band arranged to cooperate therewith, a stationary abutment disposed opposite to the opening in said band, an operating lever pivotally connected to one end of said band, a stud having a slidable connection with the other end of said band and a slidable and pivotal connection with said operating lever, a spring surrounding said stud with its ends abutting against said abutment and said second mentioned end of said brake band, said stud having a shouldered portion, and a second spring surrounding said stud between the shouldered portion thereof and said lever.

4. A brake drum, an open external friction brake band arranged to cooperate therewith, a stationary abutment disposed opposite to the opening in said band, an operating lever pivotally connected to one end of said band, a stud having a slidable connection with the other end of said band and a slidable and pivotal connection with said operating lever, a spring surrounding said stud with its ends abutting against said abutment and said second mentioned end portion of said brake band, said stud having a shouldered portion, a second spring surrounding said stud between the shouldered portion thereof and said lever, and adjustable means on the ends of said stud cooperating with the second mentioned end portion of said band and said operating lever respectively for adjusting the clearance between said drum and said band.

5. A brake drum, an open external friction brake band arranged to cooperate therewith, a stationary abutment disposed opposite to the opening in said band, an operating lever pivotally connected to one end of said band, a stud having a slidable connection with the other end of said band and a slidable and pivotal connection with said operating lever, a spring surrounding said stud with its ends abutting against said abutment and the second mentioned end portion of said brake band respectively, said stud having an integral collar formed thereon, a second spring surrounding said stud between the collar thereof and said lever, said collar being adapted to cooperate with said abutment in the released position of said band, and adjustable means on the ends of said stud cooperating with the second mentioned end portion of said brake band and operating lever respectively for adjusting the clearance between one half of said band and said drum independently of the other half of said band.

6. A brake drum, an open external friction brake band arranged to cooperate therewith, brackets fixed to the respective ends of said band, a stationary abutment located between said brackets, an operating lever pivoted to one of said end brackets and having a trunnion pin journaled therein, a stud passing through alined openings in the other of said end brackets, said abutment and said trunnion pin and having an integral collar, a spring surrounding said stud with its ends abutting against said second mentioned bracket and said abutment respectively, a second spring surrounding said stud between the collar thereof and said trunnion pin, and nuts on the ends of said studs, said nuts being adapted to engage respectively said trunnion pin and the end bracket at the opposite end of said band.

7. A brake drum, an open external friction brake band arranged to cooperate therewith, an anchor for said band, a stationary abutment disposed between the ends of said band, an operating lever pivoted to one end of said band and having a trunnion pin journaled therein, a stud passing through an opening in said abutment and having an integral collar portion located adjacent thereto, said stud having one end adjustably connected to said trunnion pin and having its other end adjustably connected to the opposite end of said band, a spring interposed between said abutment and said last mentioned end of said band, and a second spring surrounding said stud between the collar thereof and said trunnion pin.

8. A brake drum, an open external brake band arranged to cooperate therewith, an anchor for said band, brackets fixed to the respective ends of said band, a stationary abutment disposed between said brackets; an operating lever pivotally connected to one of said brackets and having a trunnion pin mounted therein, a stud passing through alined openings in the other of said end brackets, said abutment and said trunnion pin, said stud having a collar formed thereon adapted to cooperate with said abutment in the released position of said brake, a spring surrounding said stud between one side of said abutment and said second mentioned bracket, a second spring surrounding said stud between the collar thereof and said trunnion pin, said stud projecting beyond said second mentioned bracket and said trunnion pin, and adjusting nuts on the projecting end portions of said stud, whereby the clearance between said band and said drum may be regulated.

Signed at Detroit, Michigan, this 29th day of June, 1921.

HERBERT VANDERBEEK.